UNITED STATES PATENT OFFICE.

RICHARD STRIBECK, OF GRUNEWALD, NEAR BERLIN, GERMANY.

LATTEN (YELLOW BRASS).

No. 887,540.      Specification of Letters Patent.      Patented May 12, 1908.

Application filed August 9, 1906. Serial No. 329,860.

*To all whom it may concern:*

Be it known that I, RICHARD STRIBECK, engineer, subject of Prussia, residing at Grunewald, near Berlin, Germany, have invented new and useful Improvements in Latten (Yellow Brass) Which is Not Brittle at High Temperatures, of which the following is a specification.

All species of latten (yellow brass) which are actually on the market and which are called susceptible of being rolled and cast into molds affect more or less considerable brittleness when exposed to or worked at temperatures between 300 and 550 degrees centigrade, so that they cannot be used for numerous purposes. Such brittleness is caused by a certain percentage of lead or oxids or of both these substances which cannot be avoided in the actually followed methods of industrial production of said alloys.

According to the present invention such hot-brittleness of latten is avoided by the addition of a certain quantity of phosphorus, the percentage of the latter being provided in order to produce an alloy in which 0.03 to 0.10 parts of phosphorus are contained per 100 parts of total weight of the alloy ready for being worked or otherwise used. The augmentation or diminution of this percentage is unfit for the effect aimed at and will even prove to be detrimental in many cases, inasmuch as a surplus of phosphorus reduces the malleability of the material, while insufficient phosphoration of the same does not, as it is intended, do away with the above-said brittleness appearing at high temperatures in common latten-compositions. Within the above-indicated limits, viz. between 0.03 and 0.10%, the addition of phosphorus to common latten varies according to the amount of lead or oxids which is contained in the material supplied by the trade and subjected to the modification according to the present invention.

It is in itself known to add phosphorus to latten. But it is new to measure this addition of phosphorus in such a way that in the finished metal an amount of phosphorus is contained which is no smaller than 0.03 and no larger than 0.10%. The quantity of the addition of phosphorus to the charge which corresponds to this amount of phosphorus in the finished metal depends upon the kind of phosphorus added and upon the method of smelting, and may in each case be easily determined by the aid of analysis. The metal described differs also materially from the kinds of so-called latten which are malleable when warm, for the latter are tough only at red-heat, but do not show any sufficient toughness at temperatures between 300 and 550 degrees.

Latten toughened according to the present invention is recognized to be exceedingly available for numerous applications in which it is exposed to high temperatures. As an example of such cases in which common latten-alloys are unsuitable may be cited pipings conducting superheated steam, etc.

Having thus described my invention what I claim as new and desire to secure by Letters Patent is:

Phosphorus latten in which the phosphorus contained in the finished metal amounts to from 0.03 to 0.10%, so that the latten does not become brittle at temperatures of between 300 and 500 degrees.

In testimony whereof I have signed my name to this specification in the presence of two subscribing witnesses.

RICHARD STRIBECK.

Witnesses:
     HENRY HASPER,
     WILLIAM MAYNER.